US012733033B2

(12) United States Patent
Sun et al.

(10) Patent No.: US 12,733,033 B2
(45) Date of Patent: Sep. 8, 2026

(54) PACKET DETECTION FOR NON-PRIMARY CHANNEL

(71) Applicant: QUALCOMM Incorporated, San Diego, CA (US)

(72) Inventors: Yanjun Sun, San Diego, CA (US); George Cherian, San Diego, CA (US); Alfred Asterjadhi, San Diego, CA (US); Abhishek Pramod Patil, San Diego, CA (US); Gaurang Naik, San Diego, CA (US); Sai Yiu Duncan Ho, San Diego, CA (US); Abdel Karim Ajami, Lakeside, CA (US); Youhan Kim, Saratoga, CA (US)

(73) Assignee: QUALCOMM Incorporated, San Diego, CA (US)

(*) Notice: Subject to any disclaimer, the term of this patent is extended or adjusted under 35 U.S.C. 154(b) by 756 days.

(21) Appl. No.: 17/823,385

(22) Filed: Aug. 30, 2022

(65) Prior Publication Data

US 2024/0073946 A1 Feb. 29, 2024

(51) Int. Cl.
*H04W 74/0816* (2024.01)
*H04W 72/12* (2023.01)

(52) U.S. Cl.
CPC ....... *H04W 74/0816* (2013.01); *H04W 72/12* (2013.01)

(58) Field of Classification Search
CPC ...... H04W 74/0816; H04W 72/12; H04L 1/20
See application file for complete search history.

(56) References Cited

U.S. PATENT DOCUMENTS

2010/0046482 A1* 2/2010 Sridhara ............... H04W 72/12 370/336
2011/0116401 A1* 5/2011 Banerjea ............... H04W 84/12 370/252
2011/0317674 A1* 12/2011 Park .................. H04W 74/0816 370/445
2013/0308580 A1* 11/2013 Park ........................ H04L 45/28 370/329

(Continued)

FOREIGN PATENT DOCUMENTS

KR 20250044289 A * 3/2025 ............ H04W 84/12
WO WO-2022057901 A1 * 3/2022 .......... H04W 4/0816
WO WO-2024025340 A1 * 2/2024 ............ H04W 84/12

OTHER PUBLICATIONS

International Search Report and Written Opinion—PCT/US2023/072307—ISA/EPO—Nov. 22, 2023.

(Continued)

*Primary Examiner* — Ian N Moore
*Assistant Examiner* — Latresa A McCallum
(74) *Attorney, Agent, or Firm* — Harrity & Harrity, LLP

(57) ABSTRACT

Various aspects of the present disclosure generally relate to wireless communication. In some aspects, a wireless device may perform packet detection or energy detection on a primary channel using a first packet detector. The wireless device may perform packet detection or energy detection on a first non-primary channel using a second packet detector. The wireless device may transmit a packet on the first non-primary channel based on packet detection for the primary channel or packet detection for the first non-primary channel. Numerous other aspects are described.

30 Claims, 12 Drawing Sheets

(56) References Cited

U.S. PATENT DOCUMENTS

| | | | | |
|---|---|---|---|---|
| 2014/0192820 | A1* | 7/2014 | Azizi | H04W 74/0816 370/445 |
| 2015/0312051 | A1* | 10/2015 | Ling | H04L 12/2861 375/222 |
| 2017/0311325 | A1* | 10/2017 | Cariou | H04B 7/0452 |
| 2020/0059914 | A1* | 2/2020 | Akoum | H04W 4/44 |
| 2020/0274686 | A1* | 8/2020 | Khude | H04W 74/0816 |
| 2020/0288439 | A1* | 9/2020 | Seok | H04L 5/0094 |
| 2020/0413465 | A1* | 12/2020 | Park | H04W 76/15 |
| 2021/0385865 | A1* | 12/2021 | Mueck | H04W 80/02 |
| 2022/0109596 | A1* | 4/2022 | Yu | H04W 72/12 |
| 2023/0232452 | A1* | 7/2023 | Li | H04W 74/002 370/329 |

OTHER PUBLICATIONS

Verma S (Broadcom)., "Proposals on unused bandwidth utilizations", IEEE Draft, 11-20-0363-03-00BE-Proposals-on-unused-ban Dwidth-utilizations, IEEE-SA Mentor, Piscataway, NJ USA, vol. 802.11 EHT, 802.11be, No. 3, Aug. 26, 2020, pp. 1-18, XP068172278, slide 3, slide 5, slide 7, slides 8-9.

* cited by examiner

PACKET DETECTION FOR NON-PRIMARY CHANNEL

FIELD OF THE DISCLOSURE

Aspects of the present disclosure generally relate to wireless communication and to techniques and apparatuses for using end of service period indications.

BACKGROUND

A wireless local area network (WLAN) may be formed by one or more access points (APs) that provide a shared wireless communication medium for use by a number of client devices, also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

To improve data throughput, the AP may communicate with one or more STAs over multiple concurrent communication links. Each of the communication links may be of various bandwidths, for example, by bonding a number of 20 MHz-wide channels together to form 40 MHz-wide channels, 80 MHz-wide channels, or 160 MHz-wide channels. The AP may establish BSSs on any of the different communication links, and therefore it is desirable to improve communication between the AP and the one or more STAs over each of the communication links.

SUMMARY

Some aspects described herein relate to a method of wireless communication performed by a wireless device, such as a station (STA) or an access point (AP). The method may include performing packet detection or energy detection on a primary channel using a first packet detector. The method may include performing packet detection or energy detection on a first non-primary channel using a second packet detector. The method may include transmitting a packet on the first non-primary channel based on packet detection for the primary channel or packet detection for the first non-primary channel.

Some aspects described herein relate to a method of wireless communication performed by a wireless device, such as an STA or an AP. The method may include performing packet detection on a primary channel using a first packet detector. The method may include receiving a packet on a first non-primary channel in response to no packet detection on the primary channel. The method may include performing an action in response to receiving the packet on the first non-primary channel.

Some aspects described herein relate to a wireless device, such as an STA or an AP, for wireless communication. The wireless device may include a memory and one or more processors coupled to the memory. The one or more processors may be configured to perform packet detection or energy detection on a primary channel using a first packet detector. The one or more processors may be configured to perform packet detection or energy detection on a first non-primary channel using a second packet detector. The one or more processors may be configured to transmit a packet on the first non-primary channel based on packet detection for the primary channel or packet detection for the first non-primary channel.

Some aspects described herein relate to a wireless device, such as an STA or an AP, for wireless communication. The wireless device may include a memory and one or more processors coupled to the memory. The one or more processors may be configured to perform packet detection on a primary channel using a first packet detector. The one or more processors may be configured to receive a packet on a first non-primary channel in response to no packet detection on the primary channel. The one or more processors may be configured to perform an action in response to receiving the packet on the first non-primary channel.

Some aspects described herein relate to a non-transitory computer-readable medium that stores a set of instructions for wireless communication by a wireless device, such as an STA or an AP. The set of instructions, when executed by one or more processors of the wireless device, may cause the wireless device to perform packet detection or energy detection on a primary channel using a first packet detector. The set of instructions, when executed by one or more processors of the wireless device, may cause the wireless device to perform packet detection or energy detection on a first non-primary channel using a second packet detector. The set of instructions, when executed by one or more processors of the wireless device, may cause the wireless device to transmit a packet on the first non-primary channel based on packet detection for the primary channel or packet detection for the first non-primary channel.

Some aspects described herein relate to a non-transitory computer-readable medium that stores a set of instructions for wireless communication by a wireless device, such as an STA or an AP. The set of instructions, when executed by one or more processors of the wireless device, may cause the wireless device to perform packet detection on a primary channel using a first packet detector. The set of instructions, when executed by one or more processors of the wireless device, may cause the wireless device to receive a packet on a first non-primary channel in response to no packet detection on the primary channel. The set of instructions, when executed by one or more processors of the wireless device, may cause the wireless device to perform an action in response to receiving the packet on the first non-primary channel.

Some aspects described herein relate to an apparatus for wireless communication. The apparatus may include means for performing packet detection or energy detection on a primary channel using a first packet detector. The apparatus may include means for performing packet detection or energy detection on a first non-primary channel using a second packet detector. The apparatus may include means for transmitting a packet on the first non-primary channel based on packet detection for the primary channel or packet detection for the first non-primary channel.

Some aspects described herein relate to an apparatus for wireless communication. The apparatus may include means for performing packet detection on a primary channel using a first packet detector. The apparatus may include means for receiving a packet on a first non-primary channel in response to no packet detection on the primary channel. The apparatus may include means for performing an action in response to receiving the packet on the first non-primary channel.

Aspects generally include a method, apparatus, system, computer program product, non-transitory computer-readable medium, user equipment, station, access point, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1A:
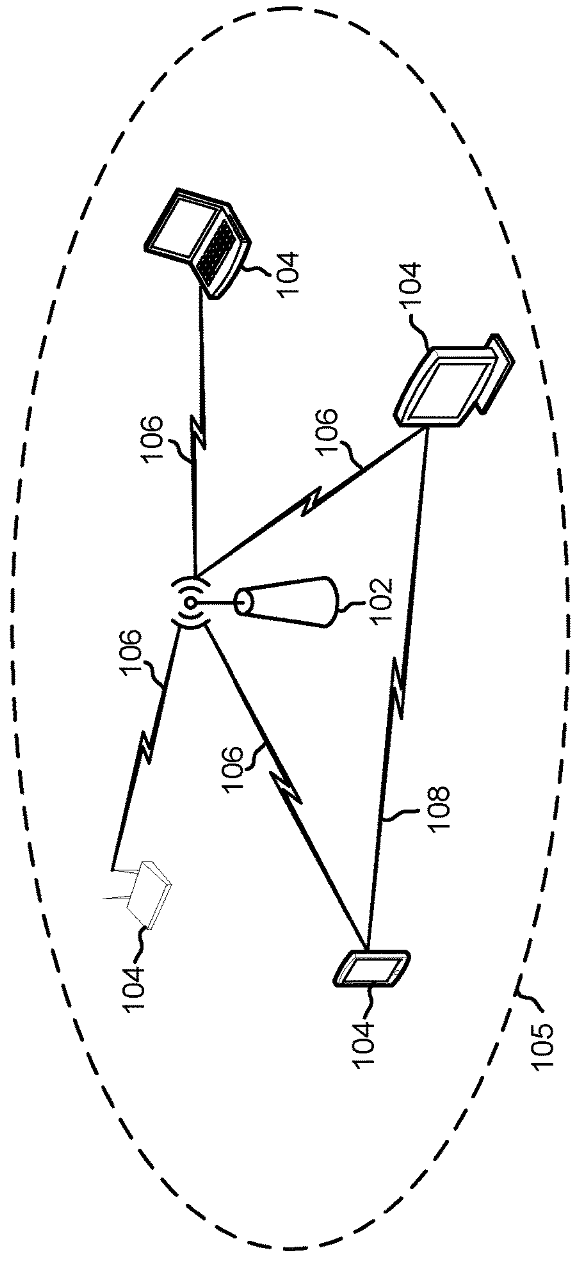
FIG. 1A is a diagram illustrating an example of a wireless communication network, in accordance with the present disclosure.
Figure 1A:

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with IEEE standards (e.g., IEEE 802) or 5G or NR radio access technology (RAT), aspects of the present disclosure can be applied to other RATs, such as ultra-wideband (UWB) technologies, a 3G RAT, a 4G RAT, and/or a RAT subsequent to 5G (e.g., 6G).

FIG. 1A shows a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one access point (AP) 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1A additionally shows an example coverage area 105 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, an STA 104 listens for beacons, which are transmitted by respective APs 102 at a periodic time interval referred to as the target beacon transmission time (TBTT) (measured in time units (TUs), where one TU may be equal to 1024 microseconds (μs)). To perform active scanning, an STA 104 generates and sequentially transmits probe requests on each channel to be scanned and listens for probe responses from APs 102. Each STA 104 may be configured to identify or select an AP 102 with which to associate based on discovery information obtained through the passive or active scans, and to perform authentication and association operations to establish a communication link 106 with the selected AP 102. After authentication, the AP 102 may assign an association identifier (AID) to each associated STA 104.

As a result of the increasing ubiquity of wireless networks, an STA 104 may have an opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As a result, an STA 104 can be covered by more than one AP 102 and can associate with different APs 102 at different times for different transmissions. Additionally, after association with an AP 102, an STA 104 also may be configured to periodically scan its surroundings to find a more suitable AP 102 with which to associate. For example, an STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 108. Additionally, two STAs 104 may communicate via a direct communication link 108 regardless of whether both STAs 104 are associated with and served by the same AP 102. In such an ad hoc system, one or more of the STAs 104 may assume the role filled by the AP 102 in a BSS. Such an STA 104 may be referred to as a group owner (GO) and may coordinate transmissions within the ad hoc network. Examples of direct wireless links 108 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and MAC layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. These PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control, and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 1B:
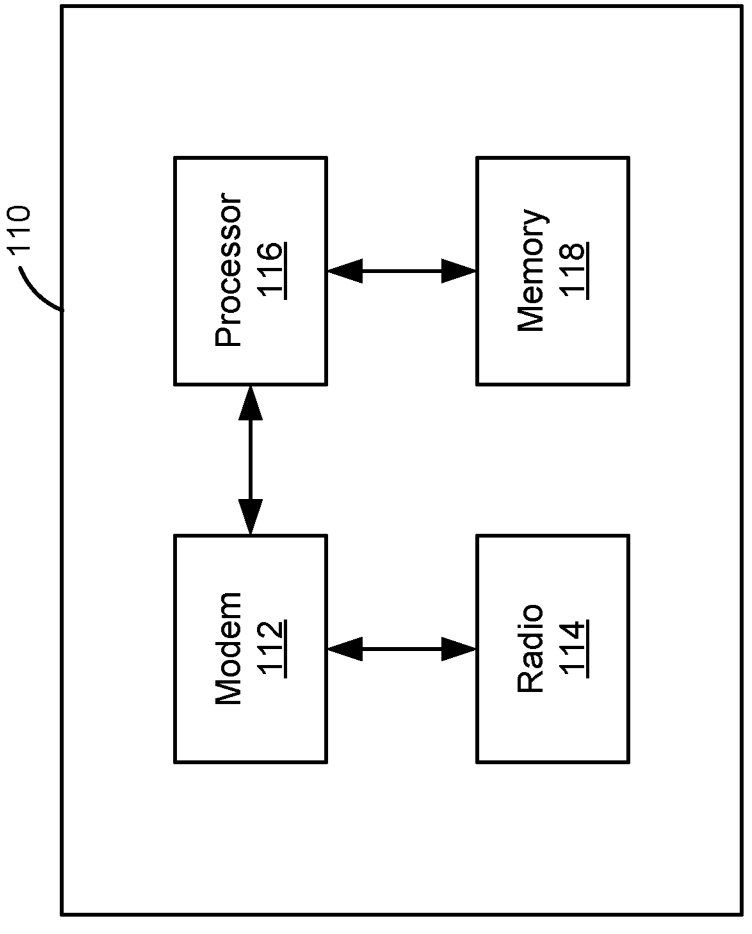
FIG. 1B shows a block diagram of an example wireless communication device, in accordance with the present disclosure.

FIG. 1B shows a block diagram of an example wireless communication device 110. In some implementations, the wireless communication device 110 can be an example of a device for use in an STA such as one of the STAs 104 described above with reference to FIG. 1A. In some implementations, the wireless communication device 110 can be an example of a device for use in an AP such as the AP 102 described above with reference to FIG. 1A. The wireless communication device 110 is capable of transmitting (or outputting for transmission) and receiving wireless communications (for example, in the form of wireless packets). For example, the wireless communication device can be configured to transmit and receive packets in the form of PPDUs and MAC protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 110 can be, or can include, a chip, system on chip (SoC), chipset, package, or device that includes one or more modems 112 (for example, a Wi-Fi (IEEE 802.11 compliant) modem). In some implementations, the one or more modems 112 (collectively "the modem 112") additionally include a WWAN modem (for example, a 3GPP 4G LTE or 5G compliant modem). In some implementations, the wireless communication device 110 also includes one or more radios 114 (collectively "the radio 114"). In some implementations, the wireless communication device 116 further includes one or more processors, processing blocks or processing elements 116 (collectively "the processor 116"), and one or more memory blocks or elements 118 (collectively "the memory 118").

The modem 112 can include an intelligent hardware block or device such as, for example, an application-specific integrated circuit (ASIC), among other possibilities. The modem 112 is generally configured to implement a PHY layer. For example, the modem 112 is configured to modulate packets and to output the modulated packets to the radio 114 for transmission over the wireless medium. The modem 112 is similarly configured to obtain modulated packets received by the radio 114 and to demodulate the packets to provide demodulated packets. In addition to a modulator and a demodulator, the modem 112 may further include digital signal processing (DSP) circuitry, automatic gain control (AGC), a coder, a decoder, a multiplexer, and a demultiplexer. For example, while in a transmission mode, data obtained from the processor 116 is provided to a coder, which encodes the data to provide encoded bits. The encoded bits are then mapped to points in a modulation constellation (using a selected modulation and coding scheme (MCS)) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 114. In implementations involving beamforming, the modulated symbols in the respective spatial streams are precoded via a steering matrix prior to their provision to the IFFT block.

While the modem 112 is in a reception mode, digital signals received from the radio 114 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/O imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 116) for processing, evaluation, or interpretation.

The radio 114 generally includes at least one RF transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 110 can include, or be coupled with, multiple transmit antennas (each with a corresponding transmit chain) and multiple receive antennas (each with a corresponding receive chain). The symbols output from the modem 112 are provided to the radio 114, which then transmits the symbols via the coupled antennas. Similarly, symbols received via the antennas are obtained by the radio 114, which then provides the symbols to the modem 112.

The processor 116 can include an intelligent hardware block or device such as, for example, a processing core, a processing block, a central processing unit (CPU), a microprocessor, a microcontroller, a digital signal processor (DSP), an ASIC, a programmable logic device (PLD) such as a field programmable gate array (FPGA), discrete gate or transistor logic, discrete hardware components, or any combination thereof designed to perform the functions described herein. The processor 116 processes information received through the radio 114 and the modem 112, and processes information to be output through the modem 112 and the radio 114 for transmission through the wireless medium. For example, the processor 116 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 116 may generally control the modem 112 to cause the modem to perform various operations described above.

The memory 118 can include tangible storage media such as random-access memory (RAM) or read-only memory (ROM), or combinations thereof. The memory 118 also can store non-transitory processor- or computer-executable software code containing instructions that, when executed by the processor 116, cause the processor to perform various operations described herein for wireless communication, including the generation, transmission, reception, and interpretation of MPDUs, frames, or packets. For example, various functions of components disclosed herein, or various blocks or steps of a method, operation, process, or algorithm disclosed herein, can be implemented as one or more modules of one or more computer programs.

Figure 1C:
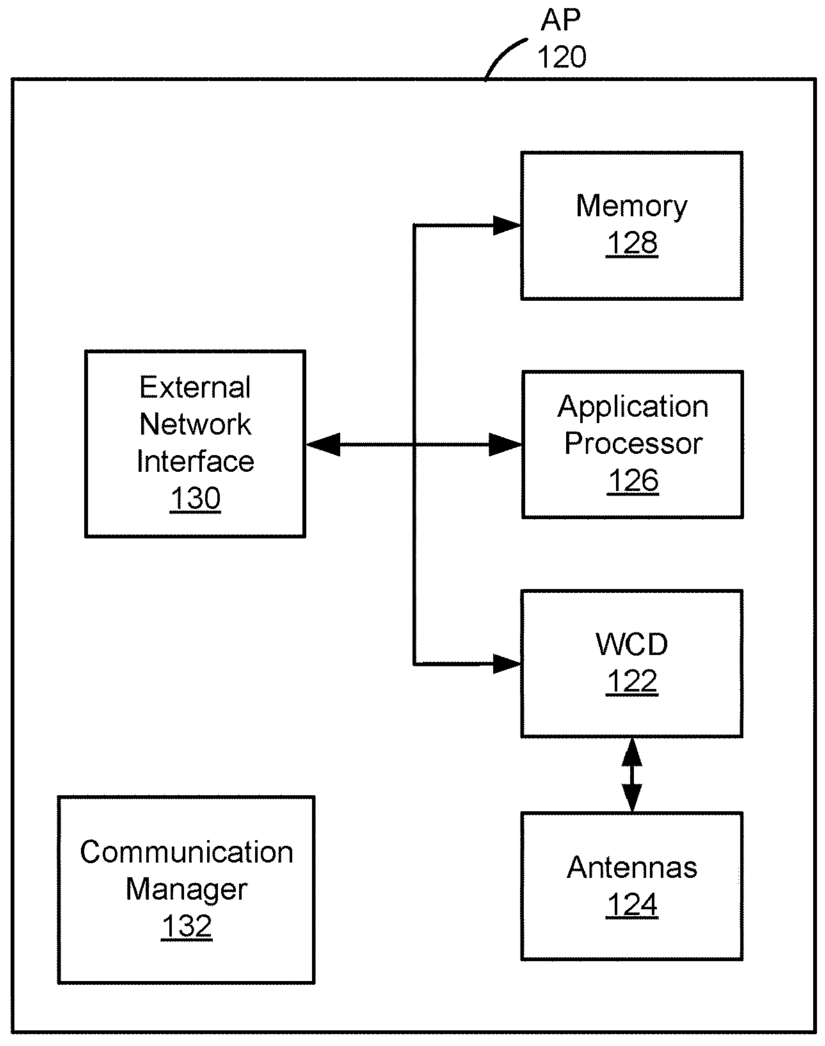
FIG. 1C shows a block diagram of an example access point (AP), in accordance with the present disclosure.

FIG. 1C shows a block diagram of an example AP 120. For example, the AP 120 can be an example implementation of the AP 102 described with reference to FIG. 1A. The AP 120 includes a wireless communication device (WCD) 122. For example, the wireless communication device 122 may be an example implementation of the wireless communication device 110 described with reference to FIG. 1B. The AP 120 also includes multiple antennas 124 coupled with the wireless communication device 122 to transmit and receive wireless communications. In some implementations, the AP 120 additionally includes an application processor 126 coupled with the wireless communication device 122, and a memory 128 coupled with the application processor 126. The AP 120 further includes at least one external network interface 130 that enables the AP 120 to communicate with a core network or backhaul network to gain access to external networks including the Internet. For example, the external network interface 130 may include one or both of a wired (for example, Ethernet) network interface and a wireless network interface (such as a WWAN interface). Ones of the aforementioned components can communicate with other ones of the components directly or indirectly, over at least one bus. The AP 120 further includes a housing that encompasses the wireless communication device 122, the application processor 126, the memory 128, and at least portions of the antennas 124 and external network interface 130.

In some aspects, a wireless device (e.g., AP 120) may include a communication manager 132. As described in more detail elsewhere herein, the communication manager 132 in, for example, a transmitting device, may perform packet detection or energy detection on a primary channel using a first packet detector. The communication manager 132 may perform packet detection or energy detection on a first non-primary channel using a second packet detector. The communication manager 132 may transmit a packet on the first non-primary channel based on packet detection for the primary channel or packet detection for the first non-primary channel.

In some aspects, the communication manager 132 in, for example, a receiving device, may perform packet detection on a primary channel using a first packet detector. The communication manager 132 may receive a packet on a first non-primary channel in response to no packet detection on the primary channel. The communication manager 132 may perform an action in response to receiving the packet on the first non-primary channel. Additionally, or alternatively, the communication manager 132 may perform one or more other operations described herein.

In some aspects, a wireless device (e.g., AP 120) includes means for performing packet detection or energy detection on a primary channel using a first packet detector; means for performing packet detection or energy detection on a first non-primary channel using a second packet detector; and/or means for transmitting a packet on the first non-primary channel based on packet detection for the primary channel or packet detection for the first non-primary channel. In some aspects, the means for the wireless device to perform operations described herein may include, for example, one or more of communication manager 132, antenna 124, application processor 126, WCD 122, and/or memory 128.

In some aspects, the wireless device includes means for performing packet detection on a primary channel using a first packet detector; means for receiving a packet on a first non-primary channel in response to no packet detection on the primary channel; and/or means for performing an action in response to receiving the packet on the first non-primary channel.

Figure 1D:
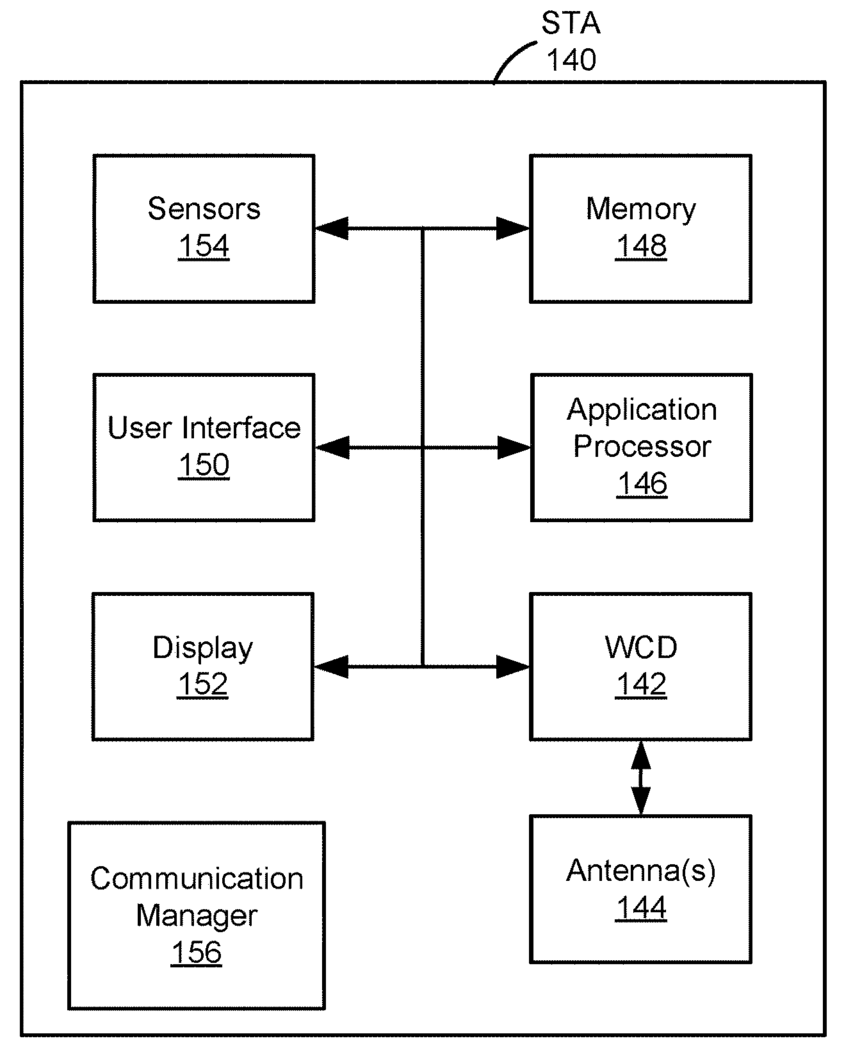
FIG. 1D shows a block diagram of an example station (STA), in accordance with the present disclosure.

FIG. 1D shows a block diagram of an example STA 140. For example, the STA 140 can be an example implementation of the STA 104 described with reference to FIG. 1A. The STA 140 includes a wireless communication device 142. For example, the wireless communication device 142 may be an example implementation of the wireless communication device 110 described with reference to FIG. 1B. The STA 140 also includes one or more antennas 144 coupled with the wireless communication device 142 to transmit and receive wireless communications. The STA 140 additionally includes an application processor 146 coupled with the wireless communication device 142, and a memory 148 coupled with the application processor 146. In some implementations, the STA 140 further includes a user interface (UI) 150 (such as a touchscreen or keypad) and a display 152, which may be integrated with the UI 150 to form a touchscreen display. In some implementations, the STA 140 may further include one or more sensors 154 such as, for example, one or more inertial sensors, accelerometers, temperature sensors, pressure sensors, or altitude sensors. Ones of the aforementioned components can communicate with other ones of the components directly or indirectly, over at least one bus. The STA 140 further includes a housing that encompasses the wireless communication device 142, the application processor 146, the memory 148, and at least portions of the antennas 144, UI 150, and display 152.

In some aspects, a wireless device (e.g., STA 140) may include a communication manager 156. As described in more detail elsewhere herein, the communication manager 156 in, for example, a transmitting device, may perform packet detection or energy detection on a primary channel using a first packet detector. The communication manager 156 may perform packet detection or energy detection on a first non-primary channel using a second packet detector. The communication manager 156 may transmit a packet on the first non-primary channel based on packet detection for the primary channel or packet detection for the first non-primary channel. In some aspects, the first packet detector and the second packet detector may be physically separated. In some aspects, the first packet detector and the second packet detector may be performed by the same components or component block (e.g., same components operate as two or more packet detectors to monitor multiple channels). In such a scenario, the performance of the packet detection may be synchronized.

In some aspects, the communication manager 156 in, for example, a receiving device, may perform packet detection on a primary channel using a first packet detector. The communication manager 156 may receive a packet on a first non-primary channel in response to no packet detection on the primary channel. The communication manager 156 may perform an action in response to receiving the packet on the first non-primary channel. Additionally, or alternatively, the communication manager 156 may perform one or more other operations described herein.

In some aspects, a wireless device (e.g., STA 140) includes means for performing packet detection or energy detection on a primary channel using a first packet detector; means for performing packet detection or energy detection on a first non-primary channel using a second packet detector; and/or means for transmitting a packet on the first non-primary channel based on packet detection for the primary channel or packet detection for the first non-primary channel. In some aspects, the means for the wireless device to perform operations described herein may include, for example, one or more of communication manager 156, antenna 144, application processor 146, WCD 142, and/or memory 148.

In some aspects, the wireless device includes means for performing packet detection on a primary channel using a first packet detector; means for receiving a packet on a first non-primary channel in response to no packet detection on the primary channel; and/or means for performing an action in response to receiving the packet on the first non-primary channel.

As indicated above, FIGS. 1A-1D are provided as examples. Other examples may differ from what is described with regard to FIG. 1A-1D.

Figure 2A:
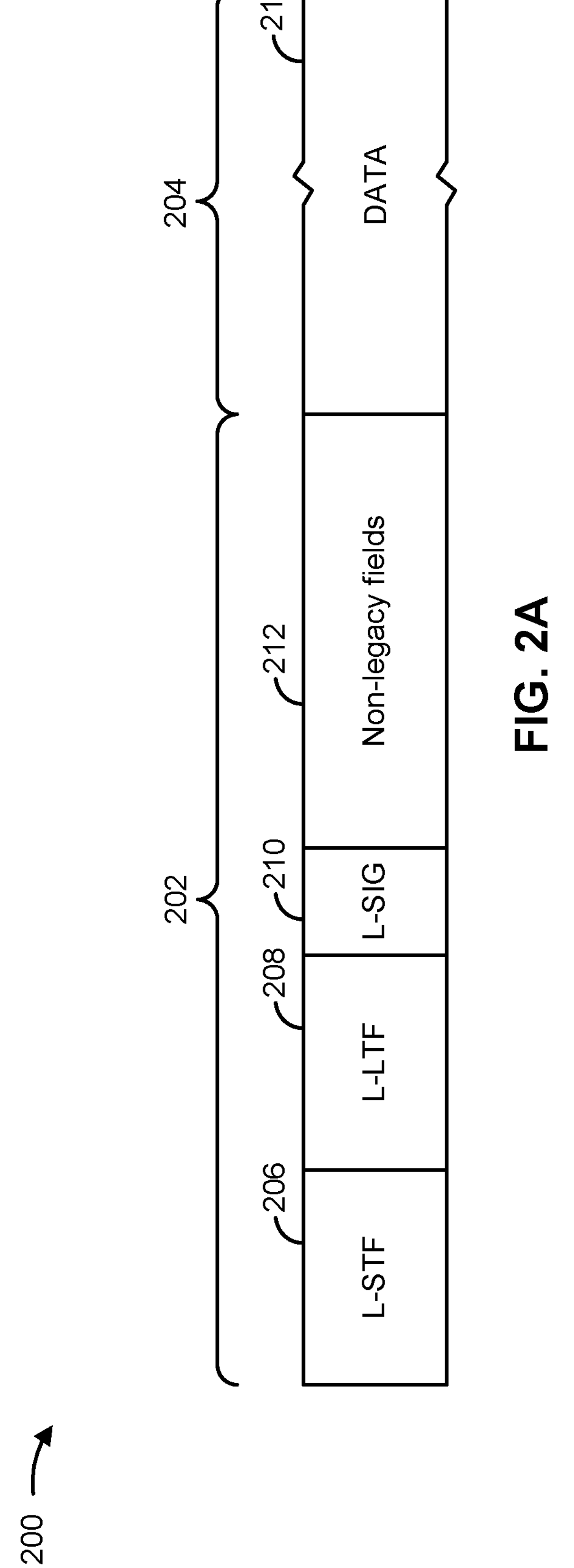
FIG. 2A shows an example protocol data unit (PDU) usable for communications between an AP and a number of STAs, in accordance with the present disclosure.

FIG. 2A shows an example PDU 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion with non-legacy field 212. The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data 214, for example, in the form of MAC protocol data units (MPDUs) or aggregated MPDUs (A-MPDUs).

Figure 2B:
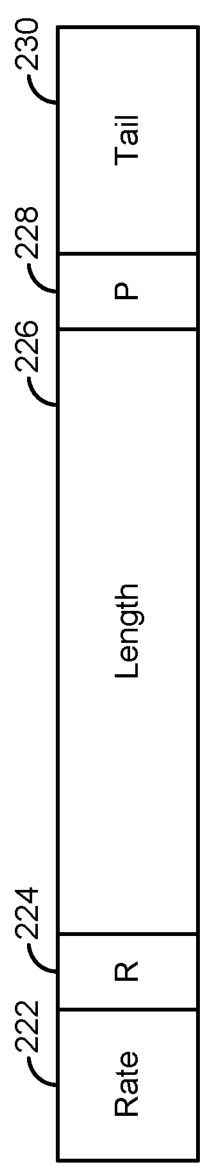
FIG. 2B shows an example field in the PDU of FIG. 2A, in accordance with the present disclosure.

FIG. 2B shows an example L-SIG field 210 in the PDU of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 230 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds (μs).

As indicated above, FIGS. 2A-2B provide examples. Other examples may differ from what is described with regard to FIGS. 2A-2B.

Figures 3A, 3B:
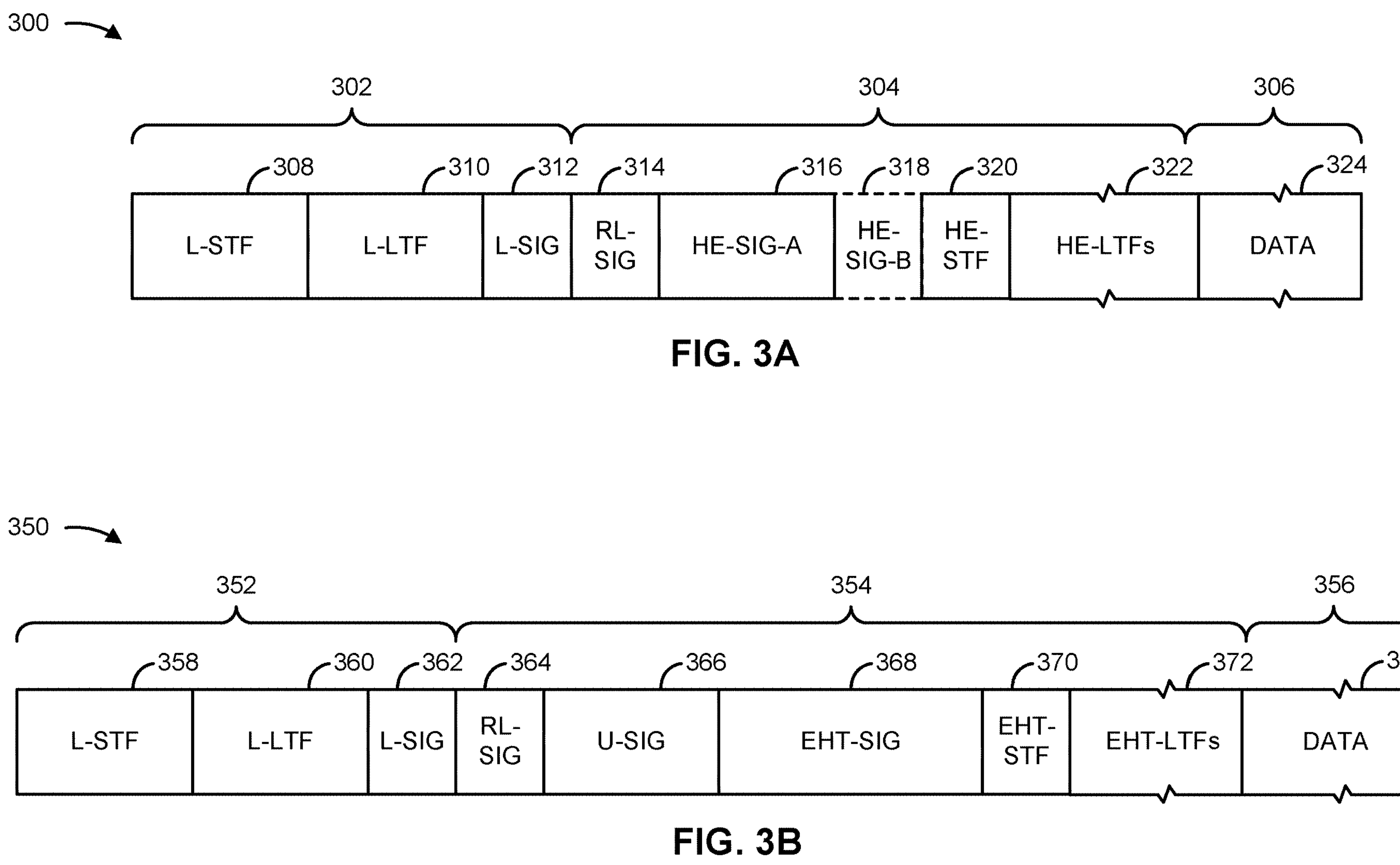
FIG. 3A shows another example PDU usable for communications between an AP and one or more STAs, in accordance with the present disclosure.
FIG. 3B shows another example PDU usable for communications between an AP and one or more STAs, in accordance with the present disclosure.

FIG. 3A shows another example PDU 300 usable for wireless communication between an AP and one or more STAs. The PDU 300 may be used for SU, OFDMA, or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the non-legacy portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled uplink (UL) or downlink (DL) resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and MCSs, among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, cyclic redundancy check (CRC) bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

FIG. 3B shows another example PPDU 350 usable for wireless communication between an AP and one or more STAs. The PDU 350 may be used for SU, OFDMA, or MU-MIMO transmissions. The PDU 350 may be formatted as an Extreme High Throughput (EHT) WLAN PPDU in accordance with the IEEE 802.11be amendment to the IEEE 802.11 wireless communication protocol standard or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a CRC (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

As indicated above, FIGS. 3A-3B provide some examples. Other examples may differ from what is described with regard to FIGS. 3A-3B.

Figure 4:
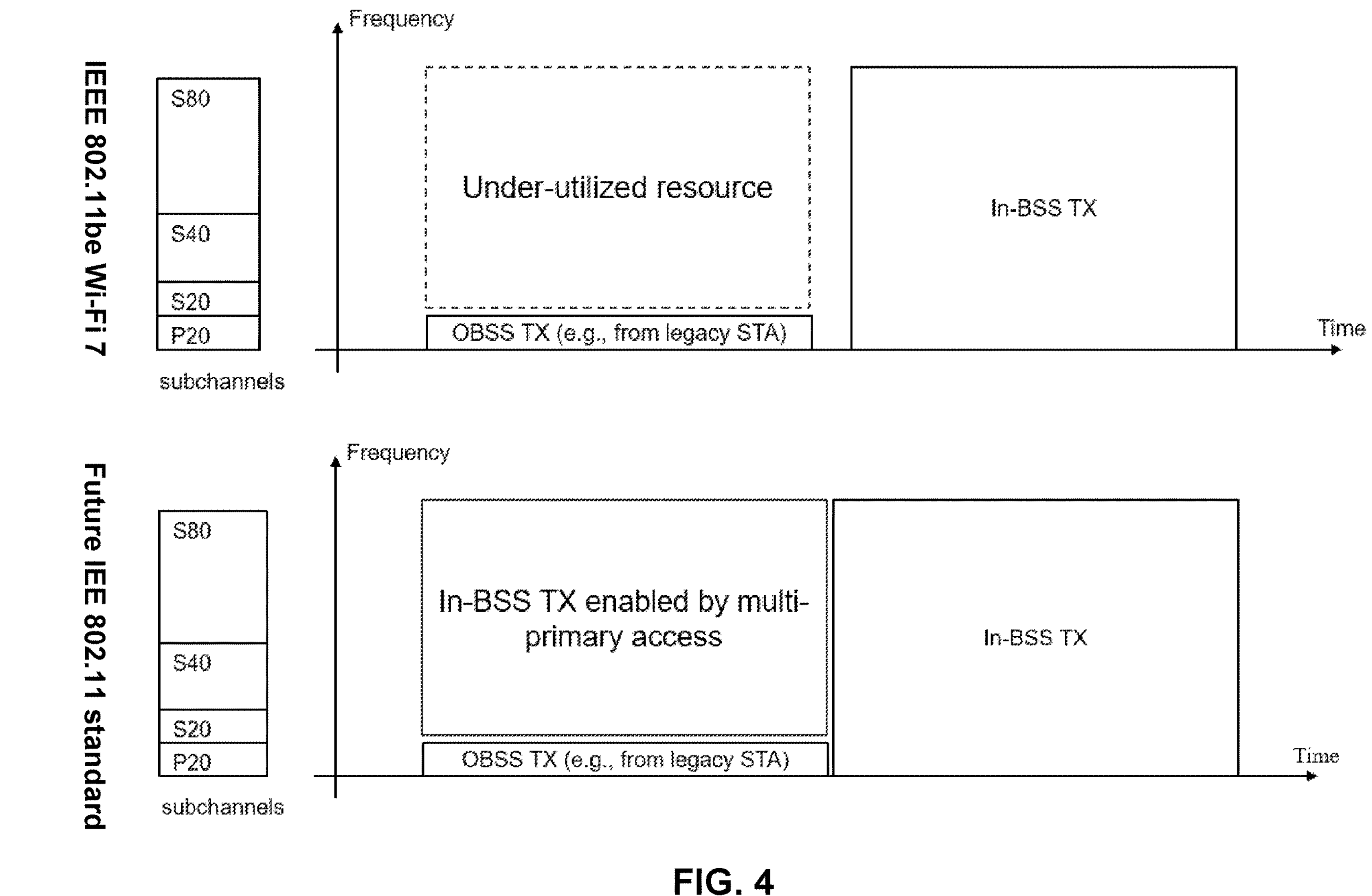
FIG. 4 is a diagram illustrating an example of spectrum used for Wi-Fi, in accordance with the present disclosure.

FIG. 4 is a diagram illustrating an example 400 of spectrum used for Wi-Fi, in accordance with the present disclosure.

Wireless communication devices, such as STAs or APs that use Wi-Fi, may use a primary channel of 20 MHz for communications (e.g., packets of data or control information). A device may perform packet detection with a packet detector and perform energy detection to determine if the primary channel is clear. If the primary channel is clear (no packet detection), the device may transmit or receive packets on the primary channel. If the primary channel is not clear (packet detection or busy), the device may not transit or receive packets on the primary channel.

Some Wi-Fi configurations, such as configurations that use IEEE 802.11be Wi-Fi 7, may use a bonded channel that includes the primary channel and non-primary channels (or secondary channels). The bonded channel may have a greater bandwidth than the primary channel. Example 400 shows that the primary channel (e.g., P20) has a bandwidth of 20 MHz, while non-primary channels may have up to at least 140 MHz (S20+S40+S80), up to 320 MHz, or greater. If packets are only transmitted or received if the primary channel is clear, because there is only one packet detector, the larger bandwidth of the non-primary channels may be underutilized. This may reduce throughput and add latency.

According to various aspects described herein, a device, such as an STA or an AP of a BSS, may use one or more additional packet detectors for packet detection on one or more non-primary channels. Example 400 also shows a configuration (e.g., for a future 802.11 standard) that enables packet transmission and reception with the non-primary channels even if the primary channel is not clear (busy). That is, other non-primary channels may be used for operations carried out using a primary channel.

The primary channel may be not clear (busy) in various scenarios. The primary channel may involve an overlapping BSS (OBSS) transmission. An OBSS may be a different BSS (Wi-Fi network) that is nearby. If an OB SS transmission during an OBSS duration is decodable, as long as a non-primary transmission is completed before the end of the OB SS transmission, the primary channel can stay up-to-date with the state of the channel (medium). The primary channel may be busy due to an unknown transmission (e.g., licensed assisted access (LAA), unlicensed NR (NR-U)). As the duration of the transmission is unknown, non-primary transmissions, if ending after the unknown transmission, may cause the primary channel to lose track of the medium state. There may be a medium synchronization delay, and a synchronization of a network allocation vector (NAV) may take time. The NAV may be a virtual carrier-sensing mechanism, which is a logical abstraction that may limit the need for physical carrier-sensing at the air interface in order to save power and that may detect transmissions that are not detectable by physical carrier-sensing. A simpler approach may be to not use non-primary transmissions or have a very short non-primary transmission for time-sensitive traffic.

Given these various scenarios of the primary channel being busy, by using additional packet detectors to perform packet detection on the non-primary channels, bandwidth may be better utilized to increase throughput and reduce latency.

In some aspects involving multi-channel operation according to European Telecommunications Standard Institute (ETSI) standards, a transmitting (Tx) device may perform exponential backoff on any channel, whether a primary channel or a non-primary channel. A backoff involves reassessing a channel at time instances that grow increasingly longer between time instances. To minimize latency, an STA may need to perform a clear channel assessment (CCA) and a backoff period. To trade latency for power, an STA may initiate backoffs on demand if the primary channel is busy or if there is time-sensitive data or buffered frames. If backoffs are performed after the primary channel is detected as busy (packet detection or energy detection), there may be a delay for the backoff to complete or there may be a NAV update. In some aspects, more than one primary channel may be allowed. For multi-primary operation, backoff may be allowed for only one non-primary channel. A secondary primary may use, for example, a lower threshold (e.g., −72 decibel milliwatts (dBm)) for energy detection rather than a typical −62 dBm threshold.

In some aspects, there may be multiple bonded channels on a link between an AP and an STA. For example, a primary channel (e.g., 20 MHz) monitored by a first packet detector is associated with a first bonded channel of 320 MHz that is the operating channel width of the BSS. A secondary primary channel of 20 MHz or greater monitored by a second packet detector may be associated with a second bonded channel within the first bonded channel. In some aspects, the second bonded channel may not include the primary channel of the first bonded channel. For example, the second bonded channel may include a non-primary 160 MHz channel within the first bonded channel of 320 MHz. The secondary primary channel may serve as the primary channel for the second bonded channel, although on the same link. In some aspects, if an NAV and energy detection indicate an idle medium and any required backoffs or deferrals are completed on the secondary primary channel, together with idle medium indicated by energy detection on the rest of the subchannels within the second bonded channel, a packet transmission may be started using the whole second bonded channel. As the complex operations are performed on the secondary primary channel instead of on all of the subchannels in the second bonded channel, this may be a reasonable tradeoff between power and latency.

In some other aspects, the second bonded channel may have the same center frequency and channel width as the first bonded channel. Physically, the second bonded channel may be identical to the first bonded channel in frequency, both equivalent to the operating channel of the link in this case. In this case, the transmission rule based on the secondary primary channel above still applies. That is, if an NAV and energy detection indicate an idle medium and any required backoffs or deferrals are completed on the secondary primary channel or on the primary channel, together with idle medium indicated by energy detection on the rest of the subchannels within the operating channel, a packet transmission may be started using the whole operating channel.

As indicated above, FIG. 4 is provided as an example. Other examples may differ from what is described with regard to FIG. 4.

Figure 5:
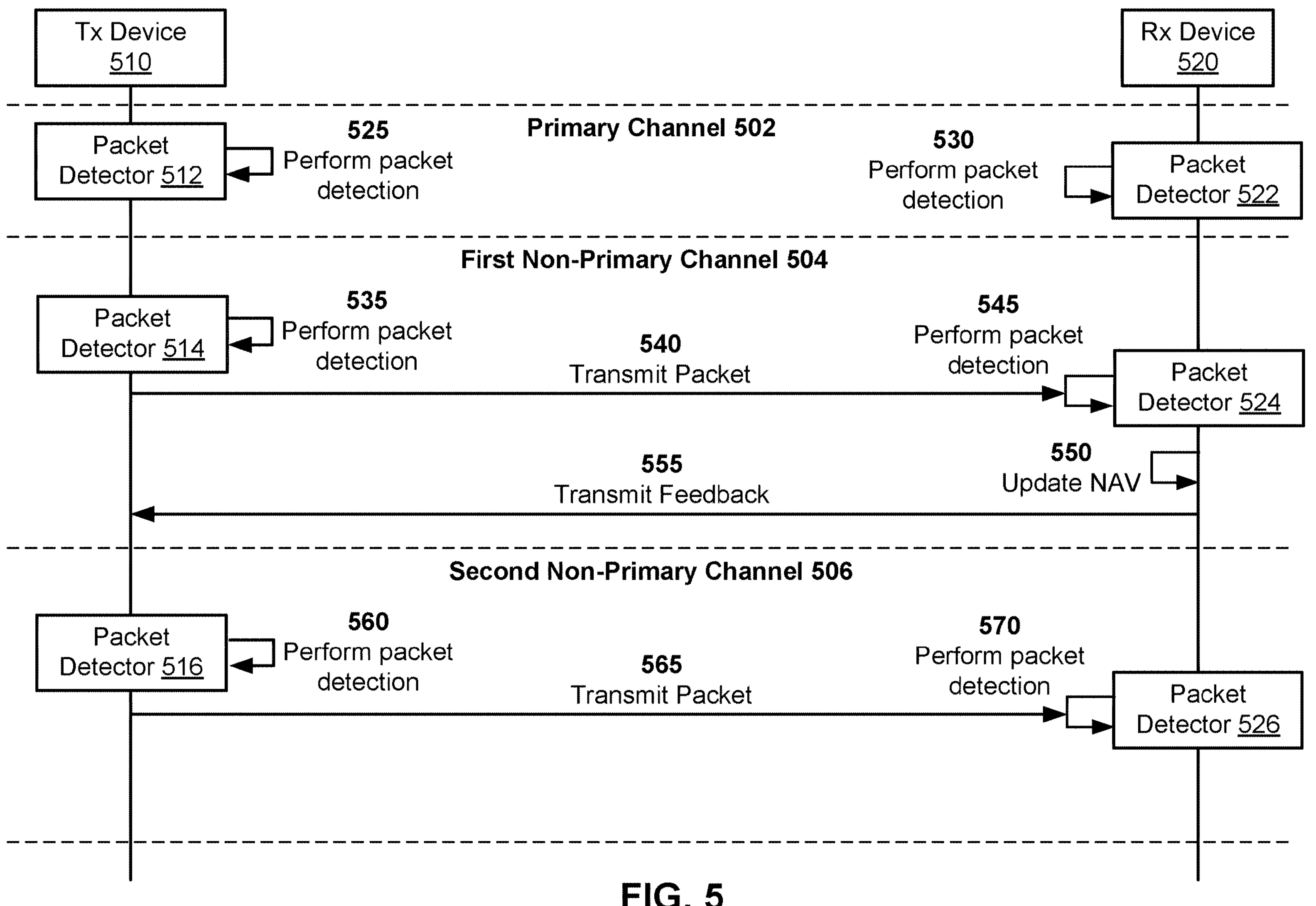
FIG. 5 is a diagram illustrating an example of using an additional packet detector for a non-primary channel, in accordance with the present disclosure.

FIG. 5 is a diagram illustrating an example 500 of using an additional packet detector for a non-primary channel, in accordance with the present disclosure. Example 500 shows a primary channel 502, a first non-primary channel 504, and a second non-primary channel 506. There may be other non-primary channels. Each non-primary channel may include one or more subchannels. The first non-primary channel 504 and the second non-primary channel 506 may have the same bandwidths or different bandwidths (e.g., smaller, greater). For example, if the primary channel 502 is 20 MHz, the first non-primary channel 504 or the second non-primary channel 506 may be 20 MHz, 40 MHz, 60 MHz, 80 MHz, 140 MHz, or some other bandwidth.

A transmitting (Tx) device 510 (e.g., AP 120, STA 140) and a receiving (Rx) device 520 (e.g., STA 140, AP 120) may communicate with each other via a wireless network (e.g., wireless network 100, a BSS). In some aspects, the Tx device 510 may include a first packet detector 512 for operation in the primary channel 502. The Tx device 510 may also include a second packet detector 514 for operation in the first non-primary channel 504. The Tx device 510 may further include a third packet detector 516 for operation in the second non-primary channel 506, and so forth for any other non-primary channels. There may also be multiple packet detectors for a non-primary channel. In some aspects, the Rx device 520 may include a first packet detector 522 for monitoring the primary channel 502. The Rx device 520 may also include a second packet detector 524 for monitoring the first non-primary channel 504. The Rx device 520 may further include a third packet detector 526 for monitoring the second non-primary channel 506, and so forth for any other non-primary channels.

Example 500 shows the operation of multiple packet detectors for non-primary channels in the Tx device 510 and multiple packet detectors for the non-primary channels in the Rx device 520. As shown by reference number 525, the Tx device 510 may perform packet detection in the primary channel 502 using packet detector 512. The Tx device 510 may also perform energy detection in the primary channel 502. As shown by reference number 530, the Rx device 520 may perform packet detection in the primary channel 502 using packet detector 522.

As shown by reference number 535, the Tx device 510 may perform packet detection in the first non-primary channel 504 using packet detector 514. The Tx device 510 may also perform energy detection in the first non-primary channel 504. Energy detection for the first non-primary channel 504 may be a lowered energy detection threshold, such as −72 dBm. In some aspects, the Tx device 510 may transmit a packet in the first non-primary channel 504, as shown by reference number 540. The Tx device 510 may transmit the packet in the first non-primary channel 504 based on packet detection (channel busy as one or more packets or sufficient quantity of packets are detected) for primary channel 502. In some aspects, if the packet that is transmitted (shown by reference number 540) is an uplink transmission to an AP, the Tx device 510 may take additional actions prior to the uplink transmission. For example, the Tx device 510 may perform a request-to-send (RTS) procedure or a clear-to-send (CTS) procedure before transmitting the packet. For another example, the Tx device 510 may wait for a triggering frame before transmitting the packet. As shown by reference number 545, the Rx device 520 may perform packet detection in the first non-primary channel 504 using packet detector 524. The Rx device 520 may receive and decode a received packet.

In some aspects, the Tx device 510 may transmit the packet in the first non-primary channel 504 based on no packet detection (channel not busy as no packets are detected or sufficient quantity of packets not detected) for the first non-primary channel 504. In some aspects, the Tx device 510 may transmit the packet in the first non-primary channel 504 based on packet detection (even if channel is busy as packets are detected) for the first non-primary channel 504. For example, the first packet detector may detect an OBSS packet from a legacy device. Transmitting based on packet detection may be applicable when the device does not consider the status of the primary channel 502 at all and relies on packet detection on the first non-primary channel 504. This is useful for urgent packet delivery (e.g., high priority low-latency traffic while there is an incoming low-priority packet on the primary channel), although the primary channel 502 may incur the cost of a medium synchronization delay on the primary channel 502. In some aspects, the Tx device 510 may limit the additional packet detectors to one additional packet detector for the first non-primary channel 504 to conserve power and cost.

The first non-primary channel 504 may be within a first bonded channel that includes the primary channel 502. The Tx device 510 may transmit packets on one or more subchannels associated with the first non-primary channel 504. If the first bonded channel includes the primary channel 502, the first bonded channel may be 320 MHz, same as the bonded channel width managed by the primary channel. The first non-primary channel 504 may be associated with and within a second bonded channel that is separate from the primary channel 502 (e.g., adjacent to the primary channel 502 but does not include the primary channel 502). For example, the second bonded channel may be 300 MHz bandwidth and the first bonded channel may be 320 MHz, as the primary channel is excluded/adjacent.

In some aspects, the Rx device 520 may perform an action based on packet detection or receiving the packet. For example, the Rx device 520 may update virtual carrier sensing information (associated with the first non-primary channel 504, the primary channel 502, or the second non-primary channel 506), such as an NAV mechanism at the Rx device 520, as shown by reference number 550. In another example, the Rx device 520 may transmit feedback for the packet, as shown by reference number 555.

The Rx device 520 may maintain an NAV for each subchannel monitored by a packet detector. The NAV may include a basic NAV (i.e., inter-BSS NAV) or an intra-BSS NAV. The NAV may be updated based at least in part on existing rules defined for the NAV for the primary channel (e.g., update the NAV based on the duration indicated in a received CTS frame) with the following exceptions. If a device performs a transmission using a channel (or subchannel), the device does not need to resynchronize its NAV on the channel (or subchannel) at the end of the transmission. For example, at the end of a successful 320 MHz data feedback acknowledgement (ACK) exchange, the NAVs on all 20 MHz channels may be expected to be up-to-date. Therefore, the device does not need to resynchronize its NAV on the channel at the end of the transmission. The device may resume or reset its previous backoff counter.

Another exception is that if the device performs a transmission without using a channel (or subchannel), the NAV on the channel is assumed to be up-to-date (therefore the device does not need to resynchronize its NAV on the channel (or subchannel) at the end of the transmission) if the length of the transmission is within a threshold (e.g., ACK) or the transmission occurs only within a duration during which the channel (or subchannel) is known to be occupied. For example, the primary channel 502 may be occupied by an OBSS-PPDU for 5 milliseconds (ms) based on the preamble of the PPDU and the device transmits a second PPDU on the first non-primary channel 504 for 4 ms (within the 5 ms). Although the packet detector on the primary channel 502 is deaf due to the second PPDU, the primary channel 502 is assumed to have an up-to-date NAV at the end of the second PPDU. If the NAV is not up-to-date (i.e., lost medium synchronization), a medium access recovery procedure (a costly operation in latency, e.g., ~5 ms) may be expected before starting any transmission on the channel.

Packet detectors may be used for other non-primary channels to improve performance. For example, as shown by reference number 560, the Tx device 510 may perform packet detection in a second non-primary channel 506 using packet detector 516. The Tx device 510 may also perform energy detection in the second non-primary channel 506. As shown by reference number 570, the Rx device 520 may perform packet detection in the second non-primary channel 506 using packet detector 526.

If the second non-primary channel 506 is clear, the Tx device 510 may transmit a packet on the second non-primary channel 506, as shown by reference number 565. Transmission may be initiated on any combination of non-primary channels that are clear (obtained access to the medium). If a non-primary channel selected for the transmission is associated with a bonded channel, any clear subchannels within the bonded channel may also be used for the transmission. Channels (or subchannels) used by the transmission may be indicated in the PHY header of the PPDU of the transmission. For example, the selected channels (or subchannels) may be indicated in a new field inserted in between the L-SIG field and the DATA field by a future 802.11 standard. This may include any combination of non-primary channels on which NAV and energy detection indicate an idle medium and any backoffs or deferrals are completed. The Tx device 510 and/or the Rx device 520 may enable one or more additional packet detectors in a network that is congested due to narrow-band OBSS to reduce latency. The Tx device 510 and/or the Rx device 520 may disable the one or more additional packet detectors to conserve power. In some aspects, the one or more additional packet detectors may be enabled only within specified time windows to minimize the time in which packet detectors are turned on. The enablement or disablement of one or more additional packet detectors may be performed via management frames (e.g., (re)association request/response frames, action frames) or via data frames (e.g., in A-Control field).

In some aspects, uplink transmission to an AP on a non-primary channel may not start unless the AP is not transmitting. For an uplink transmission on a non-primary channel to the AP, RTS/CTS may be used prior to the uplink transmission or a triggering frame from the AP may be expected prior to the start of the uplink transmission. If one non-primary channel is dedicated as a secondary-primary channel for a smaller or equal size bonded channel within the BSS's operating channel, a device may transmit on multiple subchannels within the smaller bounded channel if the NAV and energy detection indicates that the secondary primary channel is idle, if any required deferral (e.g. backoff, arbitration inter-frame spacing (AIFS) is completed, and if energy detection indicates that each of the multiple subchannels is idle within the bonded channel.

Alternatively, rather than adding one packet detector in the first non-primary channel 504 or adding multiple packet detectors in multiple non-primary channels, the Tx device 510 or the Rx device 520 may move the packet detector 512 or 522 from the primary channel 502 to the first non-primary channel 504 when a PPDU with known duration is detected on the primary channel 502.

In some aspects, an AP (e.g., AP 120) may indicate, or the Tx device 510 and the Rx device 520 may negotiate, a location of the channel that each packet detector monitors and the corresponding schedule. For example, the location may be indicated by a center frequency and a bandwidth. In another example, the location may be indicated by a channel index and operating class. If a monitored channel is associated to a bonded channel, the location of bonded channel may be indicated or negotiated in a similar fashion. For example, the AP, acting as either the Tx device 510 or the Rx device 520, may indicate a center frequency and/or a monitoring bandwidth for each packet detector via management frames such as beacons, probe responses, or (re)association responses. In another example, the AP and an STA associated with the AP may negotiate, via management frames (e.g., (re)association request/response frames, action frames) or via data frames (e.g., in A-Control field), the center frequency and/or a monitoring bandwidth for each packet detector. Negotiation may include transmitting a suggestion and receiving an acceptance, a rejection, or an acceptance with modification.

In some aspects, the AP may schedule the monitoring of non-primary channels based on traffic type, battery level, and/or the congestion of the network. The Tx device 510 may transmit scheduling information indicating the schedule for each non-primary channel. The Rx device 520 may monitor all of the time (e.g., for low-latency traffic), monitor right before a scheduled time such that multi-primary access may be used (e.g., a target wake time (TWT) service period (SP) for low-latency traffic such as for a video streaming call), or monitor on-demand (e.g., when the primary channel is busy, when a packet for low-latency traffic is to be transmitted). By using additional packet detectors to transmit on non-primary channels, a device may improve throughput and reduce latency.

As indicated above, FIG. 5 is provided as an example. Other examples may differ from what is described with regard to FIG. 5.

Figure 6:
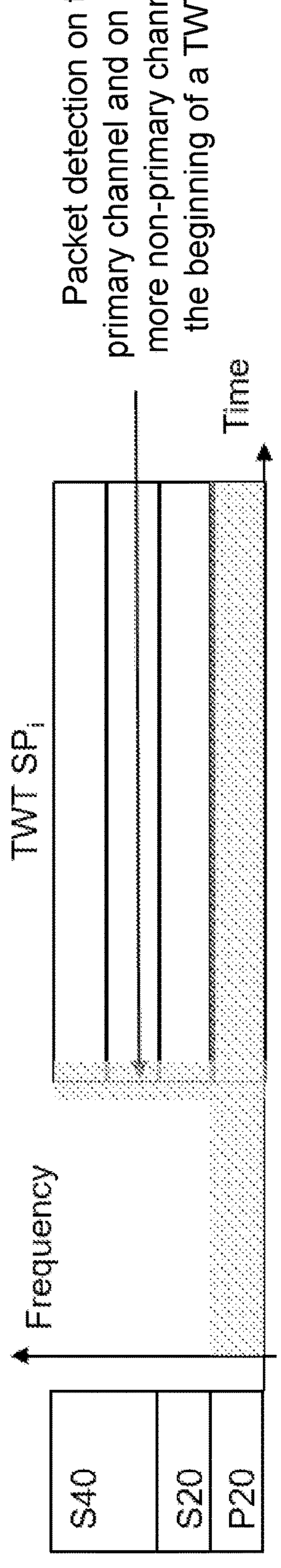
FIG. 6 is a diagram illustrating an example of transmission on multiple channels, in accordance with the present disclosure.

FIG. 6 is a diagram illustrating an example 600 of transmission on multiple channels, in accordance with the present disclosure.

In some aspects, a future IEEE 802.11 standard may achieve a better tradeoff between packet detector bandwidth and power consumption by performing packet detection only during specified, short time windows. Packet detection on one or more non-primary channels may be enabled only at the beginning of TWT SPs indicated by an AP or negotiated between the AP and a STA associated with the AP. This may help to reduce latency and power. Example 600 shows that packet detection on a primary channel and on non-primary channels may occur during a TWT SP. The packet detector bandwidth may be temporarily increased at the start of the TWT SP.

As indicated above, FIG. 6 is provided as an example. Other examples may differ from what is described with regard to FIG. 6.

Figure 7:
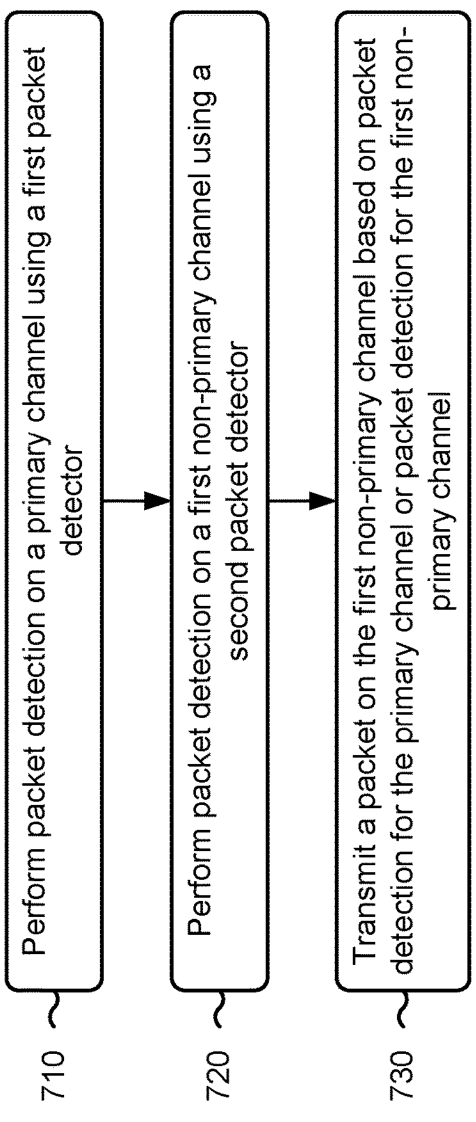
FIG. 7 is a diagram illustrating an example process performed, for example, by a wireless device acting as a transmitting device, in accordance with the present disclosure.

FIG. 7 is a diagram illustrating an example process 700 performed, for example, by a wireless device acting as a transmitting device, in accordance with the present disclosure. Example process 700 is an example where the wireless device (e.g., AP 120, STA 140) performs operations associated with packet detection for non-primary channels.

As shown in FIG. 7, in some aspects, process 700 may include performing packet detection on a primary channel using a first packet detector (block 710). For example, the wireless device (e.g., using communication manager 908 and/or detection component 910 depicted in FIG. 9) may perform packet detection on a primary channel using a first packet detector, as described above. In some aspects, process 700 may include performing energy detection on the primary channel. For example, the wireless device may perform energy detection on the primary channel.

As further shown in FIG. 7, in some aspects, process 700 may include performing packet detection on a first non-primary channel using a second packet detector (block 720). For example, the wireless device (e.g., using communication manager 908 and/or detection component 910 depicted in FIG. 9) may perform packet detection on a first non-primary channel using a second packet detector, as described above. In some aspects, process 700 may include performing energy detection on the first non-primary channel. For example, the wireless device may perform energy detection on the first non-primary channel.

As further shown in FIG. 7, in some aspects, process 700 may include transmitting a packet on the first non-primary channel based on packet detection for the primary channel or packet detection for the first non-primary channel (block 730). For example, the wireless device (e.g., using communication manager 908 and/or transmission component 904 depicted in FIG. 9) may transmit a packet on the first non-primary channel based on packet detection for the primary channel or packet detection for the first non-primary channel, as described above. In some aspects, the transmitting may be based on there being no energy detected above a threshold amount.

Process 700 may include additional aspects, such as any single aspect or any combination of aspects described below and/or in connection with one or more other processes described elsewhere herein.

In a first aspect, the bandwidth of the primary channel is 20 MHz.

In a second aspect, alone or in combination with the first aspect, the first non-primary channel is within a first bonded channel that includes the primary channel.

In a third aspect, alone or in combination with one or more of the first and second aspects, transmitting the packet on the first non-primary channel includes transmitting packets on one or more subchannels within the first non-primary channel.

In a fourth aspect, alone or in combination with one or more of the first through third aspects, the first non-primary channel is within a second bonded channel that is different than a first bonded channel that includes the primary channel.

In a fifth aspect, alone or in combination with one or more of the first through fourth aspects, process 700 includes performing packet detection or energy detection on a second non-primary channel using a third packet detector.

In a sixth aspect, alone or in combination with one or more of the first through fifth aspects, process 700 includes negotiating a location of the first non-primary channel that the second packet detector monitors. A first center frequency and a first bandwidth for the first packet detector and/or a second center frequency and a second bandwidth for the second packet detector may be negotiated.

In a seventh aspect, alone or in combination with one or more of the first through sixth aspects, the wireless device is an STA (e.g., a UE, a mobile station).

In an eighth aspect, alone or in combination with one or more of the first through seventh aspects, process 700 includes receiving scheduling information for scheduling one or more packet detectors on one or more non-primary channels.

In a ninth aspect, alone or in combination with one or more of the first through eighth aspects, process 700 includes performing an RTS procedure or a CTS procedure before transmitting the packet or waiting for a triggering frame before transmitting the packet.

In a tenth aspect, alone or in combination with one or more of the first through ninth aspects, the wireless device is a network entity or an AP.

In an eleventh aspect, alone or in combination with one or more of the first through tenth aspects, process 700 includes transmitting an indication of the first non-primary channel as a secondary primary channel.

In a twelfth aspect, alone or in combination with one or more of the first through eleventh aspects, process 700 includes transmitting scheduling information for scheduling one or more packet detectors on one or more non-primary channels.

In a thirteenth aspect, alone or in combination with one or more of the first through twelfth aspects, the scheduling information is based at least in part on one or more of a traffic type, a battery level, or traffic conditions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
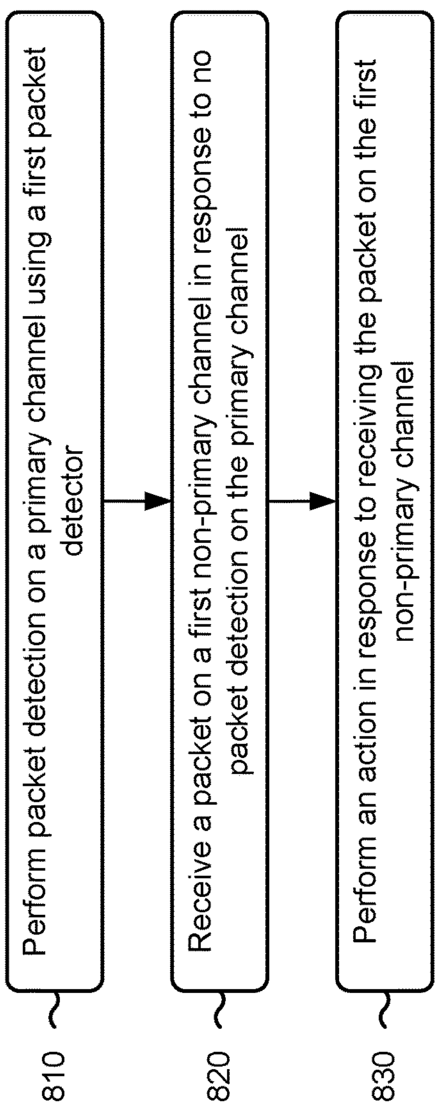
FIG. 8 is a diagram illustrating an example process performed, for example, by a wireless device acting as a receiving device, in accordance with the present disclosure.
Figure 8:

FIG. 8 is a diagram illustrating an example process 800 performed, for example, by a wireless device acting as a receiving device, in accordance with the present disclosure. Example process 800 is an example where the wireless device (e.g., wireless device AP 120, STA 140) performs operations associated with packet detection for non-primary channels.

As shown in FIG. 8, in some aspects, process 800 may include performing packet detection on a primary channel using a first packet detector (block 810). For example, the wireless device (e.g., using communication manager 1008 and/or detection component 1010 depicted in FIG. 10) may perform packet detection on a primary channel using a first packet detector, as described above.

As further shown in FIG. 8, in some aspects, process 800 may include receiving a packet on a first non-primary channel in response to no packet detection on the primary channel (block 820). For example, the wireless device (e.g., using communication manager 1008 and/or detection component 1010 depicted in FIG. 10) may receive a packet on a first non-primary channel in response to no packet detection on the primary channel, as described above.

As further shown in FIG. 8, in some aspects, process 800 may include performing an action in response to receiving the packet on the first non-primary channel (block 830). For example, the wireless device (e.g., using communication manager 1008 and/or action component 1012 depicted in FIG. 10) may perform an action in response to receiving the packet on the first non-primary channel, as described above.

Process 800 may include additional aspects, such as any single aspect or any combination of aspects described below and/or in connection with one or more other processes described elsewhere herein.

In a first aspect, process 800 includes performing packet detection on the first non-primary channel using a second packet detector.

In a second aspect, alone or in combination with the first aspect, process 800 includes performing packet detection on a second non-primary channel using a third packet detector.

In a third aspect, alone or in combination with one or more of the first and second aspects, a bandwidth of the first non-primary channel is 20 MHz or greater.

In a fourth aspect, alone or in combination with one or more of the first through third aspects, performing the action includes updating virtual carrier sensing information.

In a fifth aspect, alone or in combination with one or more of the first through fourth aspects, performing the action includes transmitting feedback for the packet on the first non-primary channel.

In a sixth aspect, alone or in combination with one or more of the first through fifth aspects, the wireless device is an STA (e.g., a UE, a mobile station).

In a seventh aspect, alone or in combination with one or more of the first through sixth aspects, process 800 includes receiving scheduling information for scheduling one or more packet detectors on one or more non-primary channels.

In an eighth aspect, alone or in combination with one or more of the first through seventh aspects, the wireless device is a network entity or an AP.

In a ninth aspect, alone or in combination with one or more of the first through eighth aspects, process 800 includes transmitting an indication of the first non-primary channel as a primary secondary channel.

In a tenth aspect, alone or in combination with one or more of the first through ninth aspects, process 800 includes transmitting scheduling information for scheduling one or more packet detectors on one or more non-primary channels.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
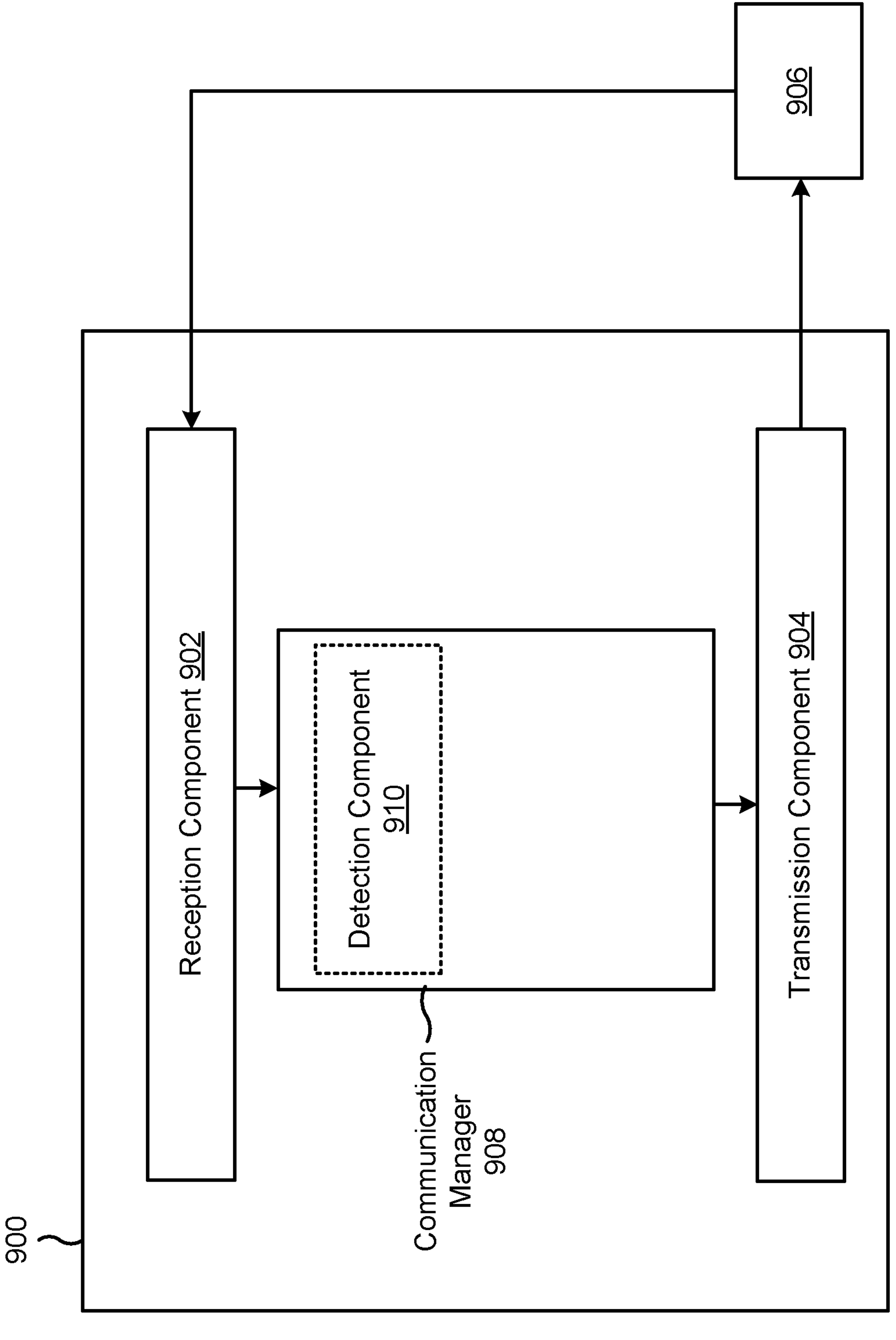
FIGS. 9-10 are diagrams of example apparatuses for wireless communication, in accordance with the present disclosure.

FIG. 9 is a diagram of an example apparatus 900 for wireless communication, in accordance with the present disclosure. The apparatus 900 may be a transmitting device (e.g., AP 120, STA 140), or a transmitting device may include the apparatus 900. While apparatus 900 is referred to as a "transmitting device" that transmits a packet, apparatus 900 is also capable of receiving packets or other communications. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908. The communication manager 908 may control and/or otherwise manage one or more operations of the reception component 902 and/or the transmission component 904. In some aspects, the communication manager 908 may include one or more antennas, a modem, a controller/processor, a memory, or a combination thereof, of the UE described in connection with FIG. 2. The communication manager 908 may be, or be similar to, the communication manager 132 or 156 depicted in FIGS. 1C and 1D. For example, in some aspects, the communication manager 908 may be configured to perform one or more of the functions described as being performed by the communication manager 132 or 156. In some aspects, the communication manager 908 may include the reception component 902 and/or the transmission component 904. The communication manager 908 may include a detection component 910, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the transmitting device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the transmitting device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the transmitting device described in connection with FIG. 2. In some aspects, the transmission component 904 may be co-located with the reception component 902 in a transceiver.

In some aspects, the detection component 910 may perform packet detection or energy detection on a primary channel using a first packet detector. The detection component 910 may perform packet detection or energy detection on a first non-primary channel using a second packet detector. The transmission component 904 may transmit a packet on the first non-primary channel based on packet detection for the primary channel or packet detection for the first non-primary channel. The detection component 910 may perform packet detection or energy detection on a second non-primary channel using a third packet detector.

The detection component 910 may negotiate the location of the first non-primary channel that the second packet detector monitors. The detection component 910 may negotiate a first center frequency and a first bandwidth for the first packet detector and a second center frequency and a second bandwidth for the second packet detector. The reception component 902 may receive scheduling information for scheduling one or more packet detectors on one or more non-primary channels.

The detection component 910 may perform an RTS procedure or a CTS procedure before transmitting the packet or to wait for a triggering frame before transmitting the packet. The transmission component 904 may transmit an indication of the first non-primary channel as a secondary primary channel. The transmission component 904 may transmit scheduling information for scheduling one or more packet detectors on one or more non-primary channels.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
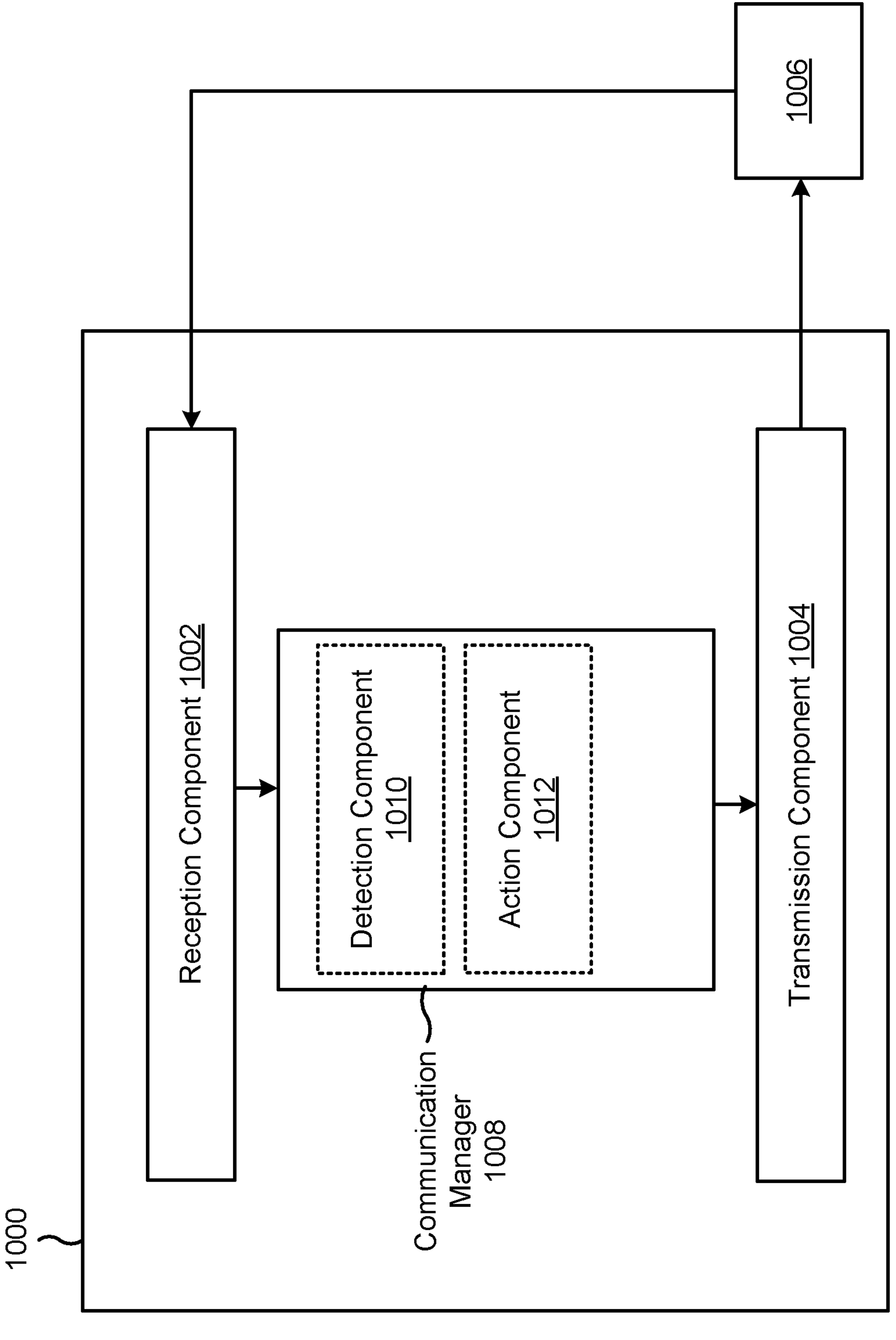

FIG. 10 is a diagram of an example apparatus 1000 for wireless communication, in accordance with the present disclosure. The apparatus 1000 may be a receiving device, or a receiving device may include the apparatus 1000. While apparatus 1000 is referred to as a "receiving device" that monitors for packets, receives a packet, and decodes the packet, apparatus 1000 is also capable of transmitting packets or other communications. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the network entity described in connection with FIG. 2. The communication manager 1008 may be, or be similar to, the communication manager 132 or 156 depicted in FIGS. 1 and 2. For example, in some aspects, the communication manager 1008 may be configured to perform one or more of the functions described as being performed by the communication manager 132 or 156. In some aspects, the communication manager 1008 may include the reception component 1002 and/or the transmission component 1004. The communication manager 1008 may include a detection component 1010 and/or an action component 1012, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the receiving device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the receiving device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the receiving device described in connection with FIG. 2. In some aspects, the transmission component 1004 may be co-located with the reception component 1002 in a transceiver.

In some aspects, the detection component 1010 may perform packet detection on a primary channel using a first packet detector. The reception component 1002 may receive a packet on a first non-primary channel in response to no packet detection on the primary channel. The detection component 1010 may perform an action in response to receiving the packet on the first non-primary channel. The detection component 1010 may perform packet detection on the first non-primary channel using a second packet detector. The detection component 1010 may perform packet detection on a second non-primary channel using a third packet detector.

The reception component 1002 may receive scheduling information for scheduling one or more packet detectors on one or more non-primary channels. The transmission component 1004 may transmit an indication of the first non-primary channel as a primary secondary channel. The transmission component 1004 may transmit scheduling information for scheduling one or more packet detectors on one or more non-primary channels. The action component 1012 may perform actions based on packet detection or no packet detection.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a wireless device, comprising: performing packet detection on a primary channel using a first packet detector; performing packet detection on a first non-primary channel using a second packet detector; and transmitting a packet on the first non-primary channel based on packet detection for the primary channel or packet detection for the first non-primary channel.

Aspect 2: The method of Aspect 1, further comprising performing energy detection on one or more of the primary channel or the first non-primary channel.

Aspect 3: The method of Aspect 1 or 2, wherein the first non-primary channel is within a first bonded channel that includes the primary channel.

Aspect 4: The method of Aspect 3, wherein transmitting the packet on the first non-primary channel includes transmitting packets on multiple subchannels within the first non-primary channel.

Aspect 5: The method of Aspect 1 or 2, wherein the first non-primary channel is within a second bonded channel that is different than a first bonded channel that includes the primary channel.

Aspect 6: The method of any of Aspects 1-5, further comprising performing packet detection or energy detection on a second non-primary channel using a third packet detector.

Aspect 7: The method of Aspect 6, further comprising negotiating the location of the first non-primary channel that the second packet detector monitors.

Aspect 8: The method of any of Aspects 1-7, wherein the wireless device is a user equipment or a mobile station.

Aspect 9: The method of Aspect 8, further comprising receiving scheduling information for scheduling one or more packet detectors on one or more non-primary channels.

Aspect 10: The method of Aspect 9, further comprising performing a request-to-send (RTS) procedure or a clear-to-send (CTS) procedure before transmitting the packet or to wait for a triggering frame before transmitting the packet.

Aspect 11: The method of any of Aspects 1-10, wherein the wireless device is a network entity or an access point.

Aspect 12: The method of Aspect 10 or 11, further comprising transmitting an indication of the first non-primary channel as a secondary primary channel.

Aspect 13: The method of any of Aspects 10-12, further comprising transmitting scheduling information for scheduling one or more packet detectors on one or more non-primary channels.

Aspect 14: The method of Aspect 13, wherein the scheduling information is based at least in part on one or more of a traffic type, a battery level, or traffic conditions.

Aspect 15: A method of wireless communication performed by a wireless device, comprising: performing packet detection on a primary channel using a first packet detector; receiving a packet on a first non-primary channel in response to no packet detection on the primary channel; and performing an action in response to receiving the packet on the first non-primary channel.

Aspect 16: The method of Aspect 15, further comprising performing packet detection on the first non-primary channel using a second packet detector.

Aspect 17: The method of Aspect 15 or 16, further comprising performing packet detection on a second non-primary channel using a third packet detector.

Aspect 18: The method of any of Aspects 15-17, wherein a bandwidth of the first non-primary channel is wider than a bandwidth of the primary channel.

Aspect 19: The method of any of Aspects 15-18, wherein performing the action includes updating virtual carrier sensing information.

Aspect 20: The method of any of Aspects 15-19, wherein performing the action includes transmitting feedback for the packet on the first non-primary channel.

Aspect 21: The method of any of Aspects 15-20, wherein the wireless device is a user equipment or mobile station.

Aspect 22: The method of Aspect 21, further comprising receiving scheduling information for scheduling one or more packet detectors on one or more non-primary channels.

Aspect 23: The method of any of Aspects 15-20, wherein the wireless device is a network entity or an access point.

Aspect 24: The method of Aspect 23, further comprising transmitting an indication of the first non-primary channel as a primary secondary channel.

Aspect 25: The method of Aspect 23 or 24, further comprising transmitting scheduling information for scheduling one or more packet detectors on one or more non-primary channels.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless device for wireless communication, comprising:

one or more memories; and one or more processors, coupled to the one or more memories, configured to:

perform packet detection on a primary channel using a first packet detector, the primary channel having a first bandwidth within an operating channel width for the wireless device;

perform packet detection on a first non-primary channel using a second packet detector, the first non-primary channel being within the operating channel width and not including the primary channel, wherein the first non-primary channel is within a first bonded channel that includes the primary channel, and wherein the first non-primary channel is within a second bonded channel that is different than the first bonded channel that includes the primary channel, and wherein the first bonded channel and the second bonded channel overlap in a same communication link; and transmit a packet on the first non-primary channel and one or more subchannels based on packet detection for the primary channel or packet detection for the first non-primary channel, the one or more subchannels being within the operating channel width and not including the first primary channel.

2. The wireless device of claim 1, further comprising performing energy detection on one or more of the primary channel and the first non-primary channel.

3. The wireless device of claim 1, wherein the first non-primary channel is being within the first bonded channel that includes the primary channel.

4. The wireless device of claim 3, wherein the one or more processors, to transmit the packet on the first non-primary channel, are configured to transmit packets on multiple subchannels within the first non-primary channel.

5. The wireless device of claim 1, wherein the one or more processors are configured to perform packet detection or energy detection on a second non-primary channel using a third packet detector.

6. The wireless device of claim 5, wherein the one or more processors are configured to negotiate a location of the first non-primary channel that the second packet detector monitors.

7. The wireless device of claim 1, wherein the wireless device is a user equipment or a mobile station.

8. The wireless device of claim 7, wherein the one or more processors are configured to receive scheduling information for scheduling one or more packet detectors on one or more non-primary channels.

9. The wireless device of claim 7, wherein the one or more processors are configured to perform a request-to-send (RTS) procedure or a clear-to-send (CTS) procedure before transmitting the packet or to wait for a triggering frame before transmitting the packet.

10. The wireless device of claim 1, wherein the wireless device is a network entity or an access point.

11. The wireless device of claim 10, wherein the one or more processors are configured to transmit an indication of the first non-primary channel as a secondary primary channel.

12. The wireless device of claim 10, wherein the one or more processors are configured to transmit scheduling information for scheduling one or more packet detectors on one or more non-primary channels.

13. The wireless device of claim 12, wherein the scheduling information is based at least in part on one or more of a traffic type, a battery level, or traffic conditions.

14. The wireless device of claim 1, wherein the packet detection on the primary channel is performed according to a first energy detection threshold, and wherein the packet detection on the first non-primary channel is performed according to a second energy detection threshold lower than the first energy detection threshold.

15. A method of wireless communication performed by a wireless device, comprising:

performing packet detection on a primary channel using a first packet detector, the primary channel having a first bandwidth within an operating channel width for the wireless device;

performing packet detection on a first non-primary channel using a second packet detector, the first non-primary channel being within the operating channel width and not including the primary channel, wherein the first non-primary channel is within a first bonded channel that includes the primary channel, and wherein the first non-primary channel is within a second bonded channel that is different than the first bonded channel that includes the primary channel, and wherein the first bonded channel and the second bonded channel overlap in a same communication link; and transmitting a packet on the first non-primary channel and one or more subchannels based on packet detection for the primary channel or packet detection for the first non-primary channel, the one or more subchannels being within the operating channel width and not including the first primary channel.

16. A wireless device for wireless communication, comprising:

one or more memories; and one or more processors, coupled to the one or more memories, configured to:

perform packet detection on a primary channel using a first packet detector, the primary channel having a first bandwidth being within an operating channel width;

receive a packet on a first non-primary channel and one or more subchannels in response to no packet detection on the primary channel, the first non-primary channel being within the operating channel width and not including the primary channel, the one or more subchannels being within the operating channel width and not including the primary channel, the first non-primary channel being within a first bonded channel that includes the primary channel, and the first non-primary channel being within a second bonded channel that is different than the first bonded channel that includes the primary channel, and wherein the first bonded channel and the second bonded channel overlap in a same communication link; and perform an action in response to receiving the packet on the first non-primary channel.

17. The wireless device of claim 16, wherein the one or more processors are configured to perform packet detection on the first non-primary channel using a second packet detector.

18. The wireless device of claim 17, wherein the one or more processors are configured to perform packet detection on a second non-primary channel using a third packet detector.

19. The wireless device of claim 16, wherein the one or more processors, to perform the action, are configured to update virtual carrier sensing information.

20. The wireless device of claim 16, wherein the one or more processors, to perform the action, are configured to transmit feedback for the packet on the first non-primary channel.

21. The wireless device of claim 16, wherein the wireless device is a user equipment or mobile station.

22. The wireless device of claim 21, wherein the one or more processors are configured to receive scheduling information for scheduling one or more packet detectors on one or more non-primary channels.

23. The wireless device of claim 16, wherein the wireless device is a network entity or an access point.

24. The wireless device of claim 23, wherein the one or more processors are configured to transmit an indication of the first non-primary channel as a primary secondary channel.

25. The wireless device of claim 23, wherein the one or more processors are configured to transmit scheduling information for scheduling one or more packet detectors on one or more non-primary channels.

26. The method of claim 15, wherein the packet detection on the primary channel is performed according to a first energy detection threshold, and wherein the packet detection on the first non-primary channel is performed according to a second energy detection threshold lower than the first energy detection threshold.

27. The method of claim 26, further comprising negotiating a location of the first non-primary channel that the second packet detector monitors.

28. A method of wireless communication performed by a wireless device, comprising:

performing packet detection on a primary channel using a first packet detector, the primary channel having a first bandwidth within an operating channel width;

receiving a packet on a first non-primary channel and one or more subchannels in response to no packet detection on the primary channel, the first non-primary channel being within the operating channel width and not including the primary channel, and the one or more subchannels being within the operating channel width and not including the primary channel, the first non-primary channel being within a first bonded channel that includes the primary channel, and the first non-primary channel being within a second bonded channel that is different than the first bonded channel that includes the primary channel, and wherein the first bonded channel and the second bonded channel overlap in a same communication link; and performing an action in response to receiving the packet on the first non-primary channel.

29. The method of claim 28, further comprising performing packet detection on the first non-primary channel using a second packet detector.

30. The method of claim 28, further comprising performing packet detection on a second non-primary channel using a third packet detector.

* * * * *